United States Patent [19]

Morris

[11] Patent Number: 5,345,893
[45] Date of Patent: Sep. 13, 1994

[54] HAY DISPENSER

[76] Inventor: J. W. Morris, 164 N. Algona Ave., San Jacinto, Calif. 92583

[21] Appl. No.: 107,976

[22] Filed: Aug. 18, 1993

[51] Int. Cl.⁵ .............................................. A01K 5/02
[52] U.S. Cl. ................ 119/51.11; 119/57.92
[58] Field of Search ............. 119/51.11, 51.12, 51.13, 119/51.01, 51.04, 57.92; 221/90

[56] References Cited

U.S. PATENT DOCUMENTS

| | | | |
|---|---|---|---|
| 657,549 | 9/1900 | Kiff | 119/51.13 X |
| 916,345 | 11/1907 | Martin | |
| 1,442,382 | 1/1923 | Bullock | |
| 2,359,398 | 4/1941 | Thompson et al. | 194/79 |
| 2,585,371 | 6/1950 | Coffing | 161/10 |
| 3,163,325 | 12/1964 | Mihalek | 221/90 |
| 3,752,358 | 8/1973 | Ohno | 221/90 |
| 4,304,340 | 12/1981 | Christian | 221/90 |
| 4,350,120 | 9/1982 | Bittle | 119/51.13 |
| 5,129,361 | 7/1992 | Deutsch et al. | 119/51.12 |

FOREIGN PATENT DOCUMENTS 1022504 12/1964 United Kingdom .

Primary Examiner—Robert P. Swiatek
Attorney, Agent, or Firm—Calif Tervo

[57] ABSTRACT

A dispenser for storing and dispensing food, such as hay, to an animal at predetermined intervals utilizes a linear force device, such as a solenoid, to operate the dispensing mechanism. The dispenser generally comprises a housing, a plurality of spaced superimposed shelves hingedly supported by the housing defining a plurality of contiguously stacked bins for supporting animal food above the ground, a latch assembly including a latch rod for supporting the shelves, and an activation mechanism coupled to the latch rod. The activation mechanism includes a battery, a solenoid having a shaft, a timer for activating the solenoid, shaft biasing means and a conversion mechanism coupling the shaft to the latch rod such that linear movement of the shaft in a first direction rotates the rod for dispensing food and such that movement of the shaft in a second direction does not rotate the rod.

6 Claims, 3 Drawing Sheets

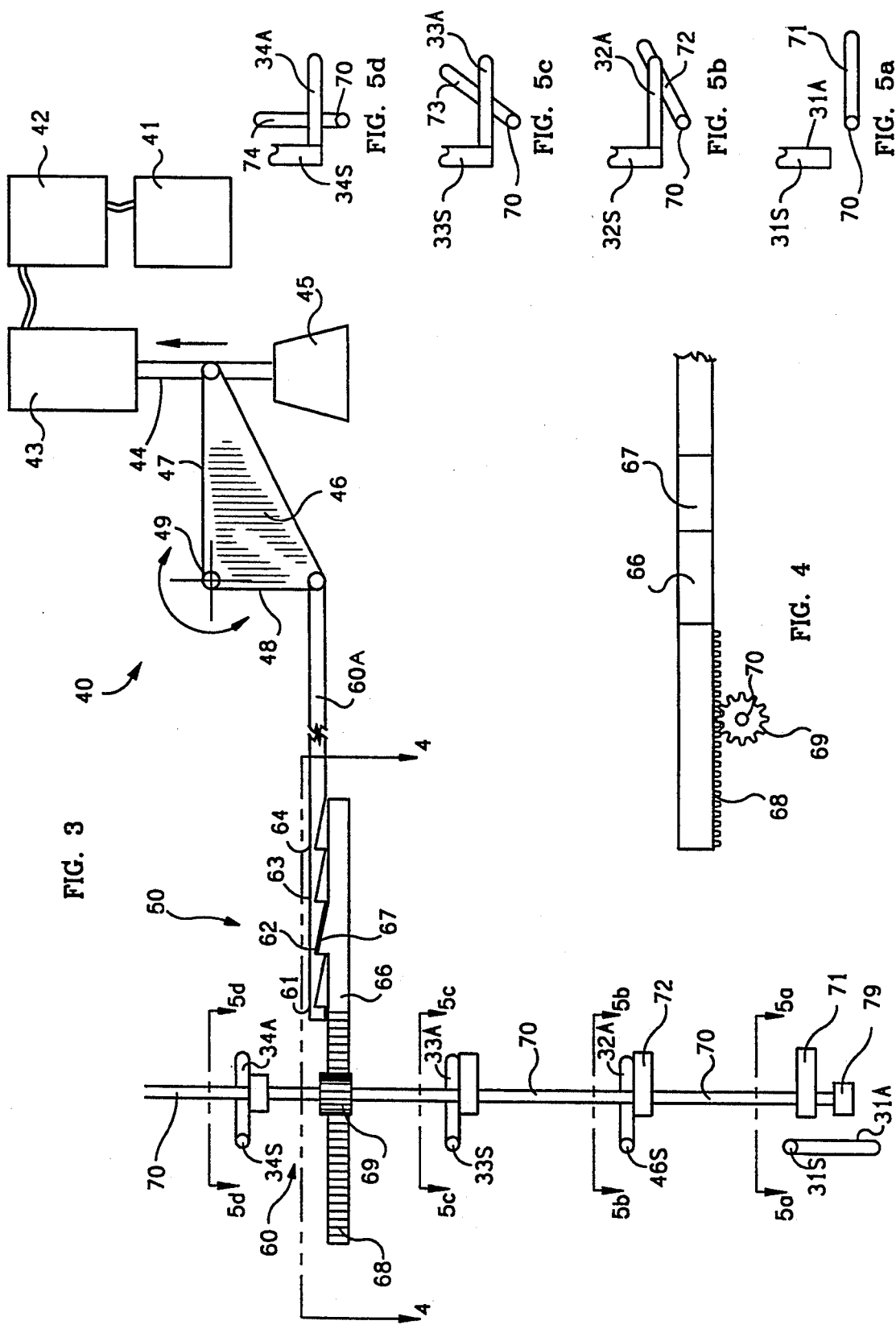

HAY DISPENSER

BACKGROUND OF THE INVENTION

1. Field of the Invention

This invention relates to a dispenser for storing and dispensing food, such as hay, to an animal at predetermined intervals and more specifically to such as dispenser that utilizes a single linear force device, such as a solenoid, to operate the dispensing mechanism.

2. Description of the Related Art

Prior art dispensers uses rotational force devices, such as stepper-motors, for moving the dispensing mechanisms. Motors as are very expensive and subject to failure.

SUMMARY OF THE INVENTION

This invention is a dispenser for storing and dispensing food, such as hay, to an animal at predetermined intervals that utilizes a linear force device, such as a solenoid, to run the dispensing mechanism. The invention generally comprises a housing, a plurality of spaced superimposed shelves supported by the housing defining a plurality of contiguously stacked bins for supporting animal food above the ground, a latch assembly including a latch rod for supporting the shelves, and an activation mechanism coupled to the latch assembly.

Each shelf has one end pivotally attached to the housing and a free end such that each is pivotable from a storage position, wherein the shelf free end is supported by a latch such that the shelf may support a quantity of animal food, to a dispensing position wherein the shelf pivots to dispensing food thereon. Rotation of the latch rod consecutively releases each shelf starting with the bottom shelf.

The activation mechanism includes a battery, a solenoid having a shaft, a timer for activating the solenoid, biasing means connected to the shaft for returning the shaft when the solenoid is not activated and a conversion mechanism coupling the shaft to a latch rod such that linear movement of the shaft in a first direction rotates the rod for dispensing food and such that movement of the shaft in a second direction does not rotate the rod.

In an exemplary embodiment, the conversion mechanism includes a ratcheting pawl connected to the solenoid shaft for movement with the shaft and engaging a first rack and a second rack attached to the first rack and engaging a pinion on the latch rod; the second rack moving linearly with the first rack and thereby rotating the latch rod for dispensing food.

An alternate embodiment, the conversion mechanism includes a ratchet wheel mounted on the latch rod and a lever arm including having a first end pivotally attached to the shaft and a second end including a ratchet pawl interacting with the ratchet wheel.

Other features and many attendant advantages of the invention will become more apparent upon a reading of the following detailed description together with the drawings in which like reference numerals refer to like parts throughout.

BRIEF DESCRIPTION OF THE DRAWINGS

FIG. 3 is an enlarged side view of the dispensing mechanism of FIG. 1.

FIG. 4 is a top view taken on line 4—4 of FIG. 3.

FIGS. 5a–5d are top views taken on lines 5a–5d of FIG. 3.

DETAILED DESCRIPTION OF THE INVENTION

Figure 1:
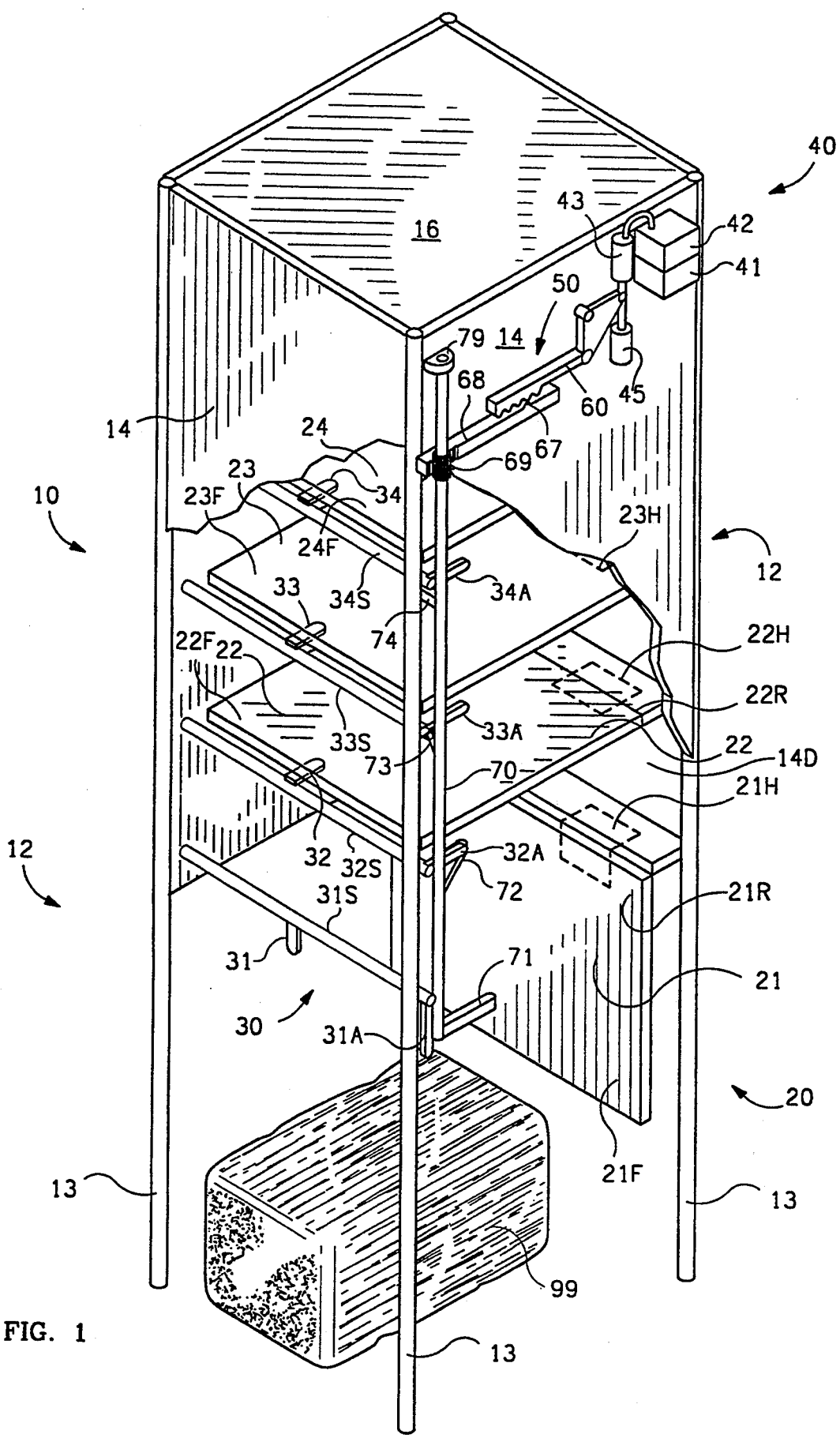
FIG. 1 is an elevated perspective view, partially cut away, of an exemplary embodiment of the hay dispenser of the invention.

With reference now to the drawings, FIG. 1 is an elevated perspective view, partially cut away, of an exemplary embodiment of the hay dispenser, denoted generally as 10, of the invention. Dispenser 10 stores and dispenses food, such as hay 99, to an animal at predetermined intervals.

Figure 2:
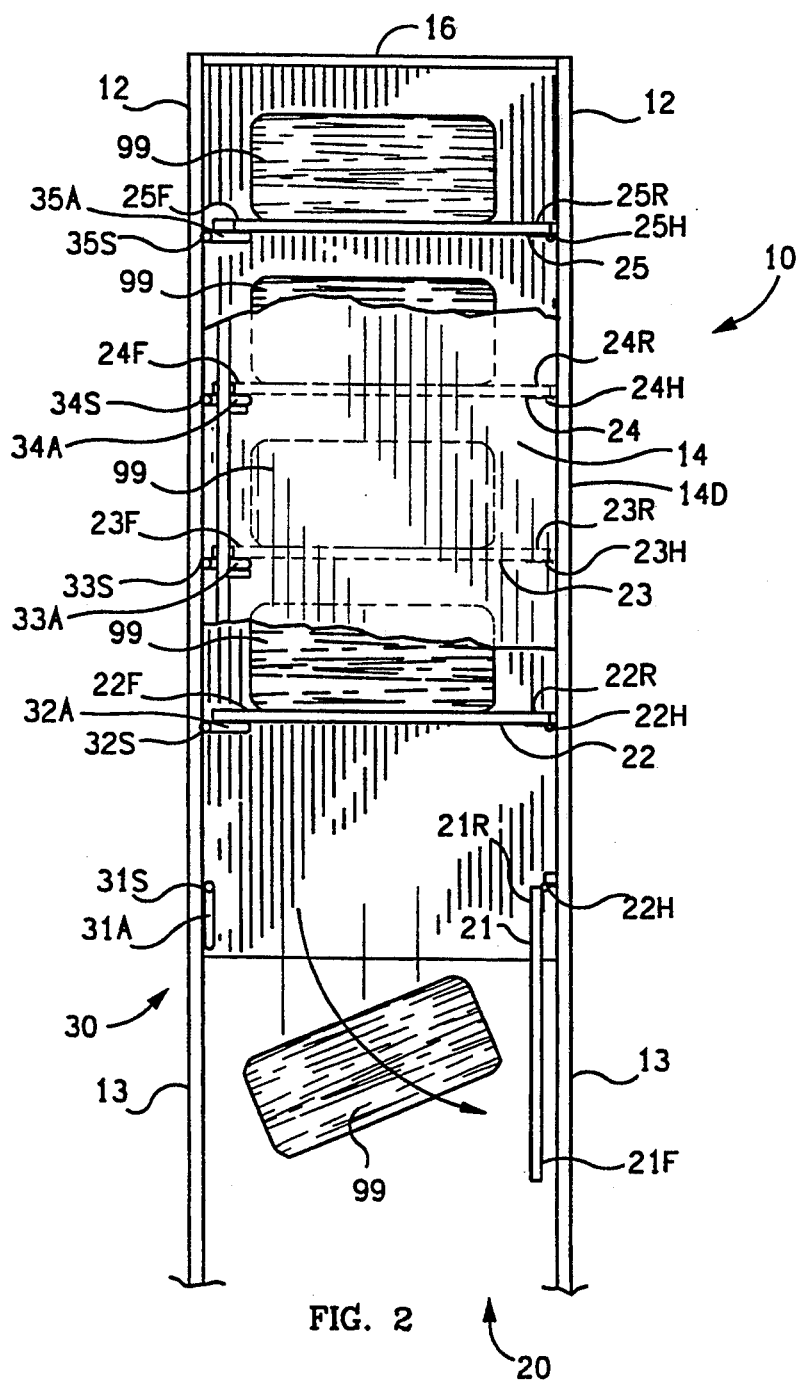
FIG. 2 is a side elevation view, partially cut-away, of a dispenser similar to that of FIG. 1 except with an additional shelf.

With respect to the common components of FIGS. 1 and 2: dispenser 10 generally comprises a housing, denoted generally as 12, a plurality of shelves, denoted generally as 20, a plurality of latches, denoted generally as 30, and an activation mechanism, denoted generally as 40.

In the embodiment shown, shelves 20 include bottom or first shelf 21, second shelf 22, third shelf 23 and fourth shelf 24. Any number of shelves may be used. For example, FIG. 2 shows additional shelf 25. Shelves 20 are supported by housing 12 in a spaced superimposed manner defining a plurality of contiguously stacked bins for supporting animal food 99 above the ground. Each shelf 20 includes a rear side 21R–24R pivotally connected by hinges 21H–24H respectively to frame 12.

The front 21F–24F of each shelf 21–24 respectively is supported by a pivotable latch 31–34, each connected to a latch shaft 31S–34S respectively. Each latch shaft 31S–34S is pivotally supported by housing 12, such as by bushings in side walls 14, such that it may rotate and pivot latch 31–34 downward to release the associated supported self front end 21F–24F. An outer end of each latch shaft 31S–34S includes an elongated release arm 31A–34A respectively. Release arms 31A–34A are sufficiently long so as to significantly reduce the support force thereon required to retain latches 30 in support position.

Each shelf 21–24 is pivotable from a storage position wherein shelf free end 21F–24 is supported by latch 31–34 such that each shelf 21–24 may support a quantity of hay 99 to a dispensing position wherein each self free end 21F–24F is not supported by latch 31–34 such that shelf 21–24 pivots about attached end 21R–24R for dispensing food thereon.

Housing 12 includes means, such as corner posts 13, for supporting first or bottom shelf 21 well off the ground such that the shelf 21 may freely pivot to the vertical or a substantially slanted position for dispensing hay 99. Preferably, housing 12 protects hay 99 in the bins from the weather and from the animal to be fed. Roof 16 covers the top bin. Side walls 14, shown partially cut away so that shelves 20 can be seen, cover the sides of the bins. One side wall, preferably rear side wall, door 14D, is openable, such as with side hinges, for loading hay 99 on shelves 21–24.

A latch rod 70 is coupled to latches 30 such that rotation of rod 70 successively releases latches 30 from the bottom up for dispensing hay 99 thereon. Latch rod 70 has a vertical longitudinal axis and is rotationally supported to housing 12, such as by sockets 79. Rod 70 is provided with a release surface for each shelf 20. Rotation of rod 70 rotates the release surfaces for successively unlatching each shelf 20. Release surfaces, such as fingers 71–74, engage latch release arms 31A–34A respectively and hold latches 30 in the support position. Fingers 71–74 are disposed radially about shaft 70 in such position as to become successively disengaged with arms 31A–34A from the bottom up upon rod 70 rotation for dispensing hay 99.

FIG. 2 is a side cross-sectional view of a dispenser 10 similar to that of FIG. 1 except with an additional shelf 25 and with the top and bottom portions of near side wall 14 cut away.

FIG. 3 shows latch rod 70 in side view.

FIGS. 5a–5d are top views taken on lines 5a–5d of FIG. 3 showing the relative placement of release surfaces, fingers 71–74, about rod 70 and their interaction with release arms 31–34.

Use of means other than fingers 71–74 for supporting and releasing release arms 31A–34A is contemplated. For example, a circular disk with a release portion cut away, such as on a cord, could be used. It is also contemplated that the rod release surface 71–74 can act directly as latches 31–34 by positioning rod 70 adjacent shelf free ends 21F–24F and supporting free ends 21F–24F with the release surfaces 71–74. However, due to the large forces exerted directly on latches 30 by the weight of hay 99, it has been found best to use the mechanical advantage of release arms 31A–34A on a rotating release surface.

FIG. 2 is a side cross-sectional view of a dispenser 10 similar to that of FIG. 1 except with an additional shelf 25 providing an additional bin for hay 99.

Turning now to FIG. 3, activation mechanism 40 is coupled to said latch rod 70 for rotating at predetermined time intervals latch rod 70. Activation mechanism 40 generally comprises an energy source, such as battery 41, a timer 42, a solenoid 43 including a shaft 44, a biasing means, such as weight 45 and a conversion mechanism coupling solenoid shaft 44 to rod 70 such that linear movement of shaft 44 in a first direction rotates rod 70 for dispensing hay 99 and such that movement of shaft 44 in a second direction does not rotate rod 70.

Timer 42, connected to and powered by battery 41 and connected to solenoid 43, is of a type well-known in the art. At selected intervals, timer 42 momentarily activates solenoid 43 to linearly move shaft 44 from a first position to a second position at predetermined time intervals. Preferably, timer 42 can be selectively programmed.

In the embodiment shown, solenoid 43 receives a signal from timer 42 and linearly retracts shaft 44. Solenoid 43 could also be directly connected to battery 41 and just receive a switch signal from timer 42.

Means is provided for transposing the vertical movement of shaft 44 into horizontal movement. A pivot plate 46, pivotally connected to pin 49 which is supported by housing 12, includes horizontal arm 47 and vertical arm 48. Horizontal arm 47 is pivotally connected to shaft 44. Vertical arm 48 is pivotally connected to ratchet mechanism 50. When powered, solenoid 43, retracts solenoid shaft 44 which pivots arms 47 and 48 about pivot point 49 which moves pawl arm 60A rearward.

Weight 45, connected to shaft 44, returns shaft 44 to the first position when solenoid 43 is not activated. Other biasing mechanisms are contemplated. For example, a spring could be used.

Ratcheting mechanism 50 generally includes ratchet pawl 60, rack bar 66, and pinion 69. Pawl 60 includes teeth 61–64 for engaging a first rack, such as tooth 67, on rack bar 66. Rack bar 66 is supported by housing 12 by any suitable means well-known in the art, such as a channel, to allow for its linear movement. Each activation of solenoid 43 pulls rack bar 66 one tooth 61–64 to the right to release a shelf 20. Upon unpowering solenoid 43, weight 45 returns solenoid shaft 44 to the starting position and moves pawl 60 over one tooth. In the position shown, solenoid 43 has been activated once such that first tooth 61 has engaged and pulled tooth 67 to the right to drop first shelf 21 and weight 45 has returned pawl 60 such that second tooth 62 is now engaged with tooth 67. Gravity is used for keeping pawl 60 engaged with tooth 67.

FIG. 4 is a top view taken on line 4—4 of FIG. 3. As can also be seen in FIG. 4, rack bar 66 includes a second rack, rack 68, that engages pinion 69 attached to latch rod 70 such that liner movement of rack bar 66 rotates latch rod 70. The exemplary embodiment is designed such that each solenoid stroke will rotate rod 70 so as to release one shelf 20.

Figure 6:
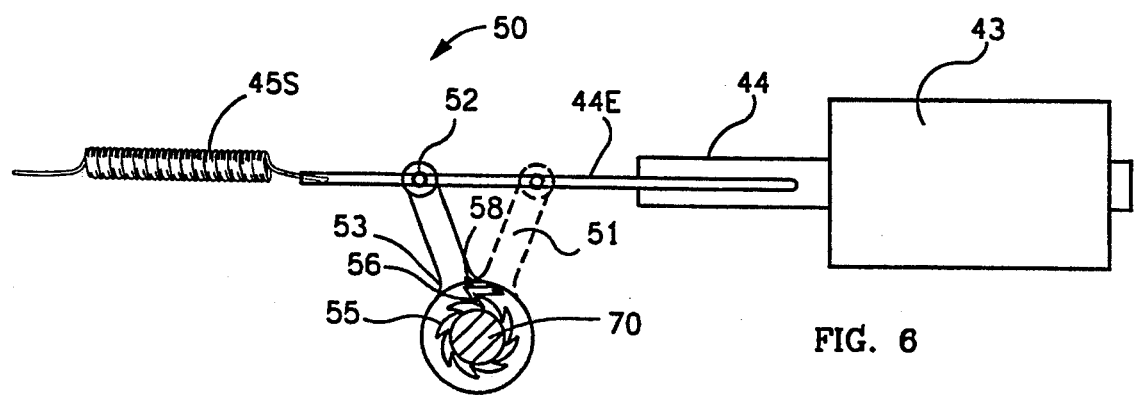
FIG. 6 is a side view of an alternate preferred embodiment of the biased linear-to-rotational movement mechanism.

FIG. 6 illustrates an alternate embodiment of the mechanism for biased linear-to-rotational movement. Lever or ratchet arm 51 includes a first end 52 pivotally connected to solenoid shaft 44 or an extension 44E thereof for movement therewith and a second end 53 ratchetly connected to latch rod 70. The ratchet connection can be by any of means well-known in the art, such as having a ratchet wheel mounted on rod 70 interacting with a pawl 56 pivotally mounted on ratchet arm inner end 53; pawl 56 being biased by spring 58, such that rearward movement of ratchet arm 51 rotates vertical shaft 70 to release one shelf and forward movement does not rotate shaft 70. Upon activation, solenoid 43 retracts shaft 44 which is connected to and moves a lever or ratchet arm 51 rearward to the position shown in phantom. Upon unpowering of solenoid 43, a biasing device, such as spring 45S, moves ratchet arm 51 and solenoid shaft 44 to the original forward position.

Having described the invention, it can be seen that it provides a very simple and rugged device for feeding animals.

Although a particular embodiment of the invention has been illustrated and described, various changes may be made in the form, composition, construction, and arrangement of the parts without sacrificing any of its advantages. Therefore, it is to be understood that all matter herein is to be interpreted and illustrative and not in any limiting sense and it is intended to cover in the appended claims such modifications as come within the true spirit and scope of the invention.

I claim:

1. A device for storing and dispensing food to an animal at predetermined intervals comprising:
   a housing;
   a plurality of spaced superimposed shelves supported by said housing defining a plurality of contiguously stacked bins for supporting animal food above the ground; including:
   a bottom shelf having:
      an attached end pivotally attached to said housing; and a free end;
said bottom shelf pivotable from a storage position wherein said bottom shelf free end is supported by a bottom latch such that said bottom shelf may support a quantity of animal food to a dispensing position wherein said bottom shelf free end is not supported by a bottom latch such that said bottom shelf pivots about said bottom shelf attached end for dispensing food thereon; and
a second shelf having:
an attached end pivotally attached higher to said housing than said first shelf and
a free end;
said second shelf pivotable from a storage position wherein said second shelf free end is supported by a second latch such that said second shelf may support a quantity of animal food to a dispensing position wherein said bottom shelf free end is not supported by a bottom latch such that said bottom shelf pivots about said bottom shelf attached end for dispensing food thereon;
a latch assembly including:
a plurality of latches including:
a bottom latch having a storage position supporting said bottom shelf free end and a dispensing position not supporting said bottom shelf free end;
a second latch having a storage position supporting said second shelf free end and a dispensing position not supporting said second shelf free end; and
a latch rod coupled to said latches such that a first rotation of said rod moves said bottom latch from the storage position to the dispensing position and a second rotation of said rod moves said second latch from the storage position to the dispensing position; and
an activation mechanism coupled to said latch rod for rotating said latch rod the first rotation and then the second rotation at predetermined time intervals comprising:
an energy source;
a solenoid connected to said energy source; said solenoid having a shaft;
a timer connected to said solenoid for activating said solenoid to linearly move said shaft from a first position to a second position at predetermined time intervals;
a biasing means connected to said shaft for returning said shaft to the first position when said solenoid is not activated; and
a conversion mechanism coupling said shaft to said rod such that linear movement of said shaft in a first direction rotates said rod for dispensing food and such that movement of said shaft in a second direction does not rotate said rod.

2. The device of claim 1 wherein:
said biasing means is a weight.

3. The device of claim 1 wherein:
said biasing means is a spring.

4. A device for storing and dispensing food to an animal at predetermined intervals comprising:
a housing;
a plurality of spaced superimposed shelves supported by said housing defining a plurality of contiguously stacked bins for supporting animal food above the ground; including:
a bottom shelf having:
an attached end pivotally attached to said housing; and
a free end;
said bottom shelf pivotable from a storage position wherein said bottom shelf free end is supported by a bottom latch such that said bottom shelf may support a quantity of animal food to a dispensing position wherein said bottom shelf free end is not supported by a bottom latch such that said bottom shelf pivots about said bottom shelf attached end for dispensing food thereon; and
a second shelf having:
an attached end pivotally attached higher to said housing than said first shelf and
a free end;
said second shelf pivotable from a storage position wherein said second shelf free end is supported by a second latch such that said second shelf may support a quantity of animal food to a dispensing position wherein said bottom shelf free end is not supported by a bottom latch such that said bottom shelf pivots about said bottom shelf attached end for dispensing food thereon;
a latch assembly including:
a plurality of latches including;
a bottom latch having a storage position supporting said bottom shelf free end and a dispensing position not supporting said bottom shelf free end;
a second latch having a storage position supporting said second shelf free end and a dispensing position not supporting said second shelf free end; and
a latch rod coupled to said latches such that a first rotation of said rod moves said bottom latch from the storage position to the dispensing position and a second rotation of said rod moves said second latch from the storage position to the dispensing position; said latch rod including:
a pinion; and
an activation mechanism coupled to said latch rod for rotating said latch rod the first rotation and then the second rotation at predetermined time intervals comprising:
an energy source;
a solenoid connected to said energy source; said solenoid having a shaft;
a timer connected to said solenoid for activating said solenoid to linearly move said shaft from a first position to a second position at predetermined time intervals;
biasing means connected to said shaft for returning said shaft to the first position when said solenoid is not activated;
a ratcheting pawl connected to said solenoid shaft for movement with said shaft;
a first rack coupled to said ratcheting pawl such that movement of said pawl in a first direction moves said first rack in the first direction and such that movement of said pawl in the second direction does not move said first rack; and
a second rack attached to said first rack and engaging said latch rod pinion; said second rack moving linearly with said first rack and thereby rotating said latch rod for dispensing food.

5. A device for storing and dispensing food to an animal at predetermined intervals comprising:
a housing;
a plurality of spaced superimposed shelves supported by said housing defining a plurality of contiguously stacked bins for supporting animal food above the ground; including:

a bottom shelf having:
- an attached end pivotally attached to said housing; and
- a free end;

said bottom shelf pivotable from a storage position wherein said bottom shelf free end is supported by a bottom latch such that said bottom shelf may support a quantity of animal food to a dispensing position wherein said bottom shelf free end is not supported by a bottom latch such that said bottom shelf pivots about said bottom shelf attached end for dispensing food thereon; and a second shelf having:
- an attached end pivotally attached higher to said housing than said first shelf and
- a free end;

said second shelf pivotable from a storage position wherein said second shelf free end is supported by a second latch such that said second shelf may support a quantity of animal food to a dispensing position wherein said bottom shelf free end is not supported by a bottom latch such that said bottom shelf pivots about said bottom shelf attached end for dispensing food thereon;

a latch assembly including:
- a plurality of latches including:
  - a bottom latch having a storage position supporting said bottom shelf free end and a dispensing position not supporting said bottom shelf free end;
  - a second latch having a storage position supporting said second shelf free end and a dispensing position not supporting said second shelf free end; and
- a latch rod coupled to said latches such that a first rotation of said rod moves said bottom latch from the storage position to the dispensing position and a second rotation of said rod moves said second latch from the storage position to the dispensing position; said latch rod having a longitudinal axis; and an activation mechanism coupled to said latch rod for rotating said latch rod the first rotation and then the second rotation at predetermined time intervals comprising:
- an energy source;
- a solenoid connected to said energy source; said solenoid having a shaft;
- a timer connected to said solenoid for activating said solenoid to linearly move said shaft from a first position to a second position at predetermined time intervals;
- a biasing means connected to said shaft for returning said shaft to the first position when said solenoid is not activated; and
- a ratchet mechanism coupling said shaft to said rod such that linear movement of said shaft in a first direction rotates said rod for dispensing food and such that movement of said shaft in a second direction does not rotate said rod.

6. The device of claim 5 wherein: said ratchet mechanism includes:

a ratchet wheel mounted on said latch rod;

a lever arm including:
- a first end attached to said shaft; and
- a second end including a ratchet pawl interacting with said ratchet wheel.

* * * * *